US005597965A

United States Patent [19]

Endo et al.

[11] Patent Number: 5,597,965

[45] Date of Patent: Jan. 28, 1997

[54] METHOD AND APPARATUS FOR MEASURING THE PRELOAD GAP OF A DOUBLE ROW ROLLING BEARING

[75] Inventors: Satoru Endo, Shiga-ken; Yoshisada Imai, Moriyama; Hiroyuki Okuno, Kusatsu, all of Japan

[73] Assignee: NSK Ltd., Tokyo, Japan

[21] Appl. No.: 346,638

[22] Filed: Nov. 30, 1994

[30] Foreign Application Priority Data

Feb. 4, 1994 [JP] Japan .................................... 6-012554

[51] Int. Cl.[6] .................................................. G01L 5/12

[52] U.S. Cl. ..................................... 73/862.49; 73/862.59

[58] Field of Search ................................ 73/818, 862.49, 73/862.59, 862.542, 593

[56] References Cited

U.S. PATENT DOCUMENTS

| | | | |
|---|---|---|---|
| 4,165,636 | 8/1979 | Bartholet | 73/862.541 |
| 4,168,160 | 9/1979 | Stöferle et al. | 73/862.541 |
| 4,203,319 | 5/1980 | Lechler | 73/862.49 |
| 5,146,791 | 9/1992 | Peter et al. | 73/862.49 |
| 5,263,372 | 11/1993 | Matsuzaki et al. | 73/862.49 |

FOREIGN PATENT DOCUMENTS

| | | |
|---|---|---|
| 59-188535 | 10/1984 | Japan . |
| 1-112019 | 4/1989 | Japan . |
| 2-159536 | 6/1990 | Japan . |
| 685864 | 1/1953 | United Kingdom . |

*Primary Examiner*—Richard Chilcot
*Assistant Examiner*—Max H. Noori
*Attorney, Agent, or Firm*—Helfgott & Karas, P.C.

[57] ABSTRACT

An method and apparatus for measuring the preload gap of a double row rolling bearing, such that it is possible to accurately determine the preload to be obtained when the inner ring is fully pressed onto the cylindrical surface of the spindle from a condition wherein the rolling bodies or members are in an unpreloaded condition prior to fully pressing the inner ring.

3 Claims, 4 Drawing Sheets

23 First Measuring Device

24 Second Measuring Device 22 19 23a 21 20 8 2b 10 1 6b 9 9 24a 7 3 9 6a 2a 25 12 14 15 15 16 18 18 17 4 26 5

METHOD AND APPARATUS FOR MEASURING THE PRELOAD GAP OF A DOUBLE ROW ROLLING BEARING

FIELD OF THE INVENTION

The present invention is related to a method and apparatus for measuring the preload gap of a double row rolling bearing, specifically for use in measuring the size of the preload gap provided to apply a preload to a double row rolling bearing used as a hub unit for rotatably supporting the wheel of a vehicle.

DESCRIPTION OF THE RELATED ART

A hub unit such as shown in FIG. 1 is used in a suspension unit for supporting the non-drive wheel of a vehicle. The non-drive wheel is the front wheels for the front engine rear wheel drive (FR) vehicle, or the rear wheels for the front engine front wheel drive (FF) vehicle, and also referred to as the free wheel.

This hub unit has an outer ring or race 1 which has inner and outer peripheral faces. First and second outer raceways 2*a*, 2*b* are formed on the inner peripheral face of the outer ring 1. When assembling the hub unit to a vehicle, the outer ring or race 1 is supported on a suspension unit (not shown) by means of a flange 3 formed on the outer peripheral face of the outer ring 1.

Disposed radially inside the outer ring 1 is a hub 4 which has a spindle 5 inserted into the outer ring 1.

A first inner raceway 6*a* is formed on an outer peripheral face of a base portion of the spindle 5 at a location opposite to the first outer raceway 2*a* of the outer ring 1. A flange 14 for fixedly supporting a wheel (not shown), is provided on an axially outer end portion of the hub 4 (hereunder "axially outer end" refers to the end which is on the outer side in the widthwise direction when assembled to a vehicle, that is, the left end in FIG. 1). The wheel of the vehicle is fixed to the flange 14 by means of bolts 15 and nuts (not shown in the figures) threaded onto the bolts 15.

There is a step portion 12 on a central outer peripheral face of the spindle 5. A portion on the central outer peripheral face of the spindle 5 which is opposite to the first outer raceway 2*b* of the outer ring 1, constitutes a cylindrical face 7 of smaller diameter than the base portion of the spindle 5. An inner ring 8 is fitted over the cylindrical face 7. The inner ring 8 has a second inner raceway 6*b* on an outer peripheral face thereof, and is fixed to the cylindrical face 7 of the spindle 5 by means of a interference fit.

A plurality of rolling bodies or members 9 are respectively fitted between the first outer raceway 2*a* and the first inner raceway 6*a*, and between the second outer raceway 2*b* and the second inner raceway 6*b*, to provide free rotation therebetween. These rolling bodies or members 9 are held in position by a retainer or cage 13 between the first raceways 2*a* and 6*a* and between the second raceways 2*b* and 6*b*, respectively.

A male thread 10 is provided on a tip end portion of the spindle 5. A nut 11 is threaded onto the male thread 10 and tightened, so as to prevent the inner ring 8 from coming off the cylindrical face 7 of the spindle 5.

At the time of completion of assembly of the hub unit, a predetermined preload is applied to the rolling bodies or members 9. This ensures that the hub 4 is supported with respect to the outer ring 1 in the radial and thrust directions without any play.

The dimensions of the respective components are therefore specified so that in the condition wherein the end face of the inner ring 8 abuts against the step portion 12 of the outer peripheral face of the spindle 5, the preload amount is at a predetermined value.

Applying the preload is achieved by forming a "negative" gap between the respective rolling faces of the rolling bodies or members 9 and the respective contact faces of the raceways 2*a*, 2*b*, and 6*a*, 6*b*. What is meant by the negative gap is not actually a gap, but the amount of resilient deformation in the rolling faces of the rolling bodies or members 9 and the contact faces of the raceways 2*a*, 2*b*, 6*a*, 6*b*.

In the example of the FIG. 1, balls are used as the rolling bodies or members 9, however for hub units fitted to heavy duty vehicles, tapered rollers may be used as the rolling bodies or members. In this case, the shape of the respective raceways 2*a*, 2*b*, and 6*a*, 6*b* will of course also differ from that in FIG. 1, being of a linear shape in cross section.

In either case, it is important to control the preload applied to the rolling bodies or members 9 to the correct value so as to realize optimum performance for the hub unit and the vehicle into which the hub unit is fitted.

If the preload is too small, that is, the force pressing the rolling bodies or members 9 between the first raceways 2*a* and 6*a*, and between the second raceways 2*a*, and 6*b* is too small, then the bearing will have insufficient rigidity, and in exceptional cases, the hub 4 may rattle within the outer ring 1. As a result, driving safety is compromised, and in exceptional cases abnormal sounds may be produced while running. On the other hand, if the preload is too great, that is, the force pressing the rolling bodies or members 9 between the first raceways 2*a*, and 6*a*, and between the second raceways 2*b* and 6*b* is too large, there will be a drop in vehicle power and fuel economy due to the increased rotational resistance. Moreover the life of the hub unit will be reduced due to the excessive surface pressure on the surfaces of the respective raceways 2*a*, 2*b* and 6*a*, 6*b* and rolling bodies or members 9. Furthermore, in extreme cases, normal driving may become impossible due to abnormal heating.

In order to avoid such incorrect preloading which is the source of such problems, it is usual to measure the preload applied to the rolling bodies or members 9 in the assembled hub unit. If this preload is outside the normal range, then the relevant hub unit is discarded as a reject, and this information is fed back to the various component work steps to revise the preload to an appropriate value.

In this respect, the following known methods shown below under (1) to (6), have been used for this reason to measure the preload of the hub unit;

(1) measuring the bearing torque required to produce relative rotation between the outer ring 1 and the spindle 5, and determining the preload from this bearing torque;

(2) measuring the tightening torque when tightening the nut 11 onto the male thread 10 to fix the inner ring 8 to the spindle 5, and determining the preload from this tightening torque;

(3) measuring the amount that the nut 11 is tightened onto the male thread 10 and the amount that the inner ring 8 is displaced in the axial direction with the tightening of the nut 11, and determining the preload from the tightening and displacement amounts;

(4) exciting the components thereof to measure the resonant frequency of the hub unit constituting the rolling bearing, and determining the preload from the resonance frequency (disclosed in Japanese Patent First Publication KOKAI No. 59-188535);

(5) rotating the hub unit constituting the rolling bearing, and detecting the acoustic emission (AE) waves generated from the sliding contact faces of the hub unit using an acoustic emissions sensor, and determining the preload from the amplitude of the detected acoustic emission waves (disclosed in Japanese Patent First Publication KOKAI No. 1-112019); and (6) transmitting a vibration by way of the rolling bodies or members 9 from the outer ring 1 to the hub 4 constituting the inner ring, or from the hub 4 to the outer ring 1, and determining the preload based on the change in amplitude accompanying the vibration transmission (disclosed in Japanese Patent First Publication KOKAI No. 2-159536);

With the preload measuring methods disclosed above under (1) to (6), the following points remain to be resolved.

With the methods of (1) to (3), although the preload can be determined approximately, accurate determination is difficult. Recently the requirements for quality and accuracy in automotive hub units has become very severe, so that with these types of measuring methods it is not always possible to obtain sufficient accuracy.

Moreover, with the methods of (4) to (6), while in practice it is possible to determine the preload to sufficient accuracy, the following problems still remain. It should be noted that the above methods (1) to (3) also have the following problems.

That is to say, all these methods are directed to measuring the applied preload once the nut 11 has been tightened after the application of the preload to the rolling bearing constituting for example a hub unit.

In the case of automotive hub units such as shown in FIG. 1 however, the hub unit is assembled at the bearing manufacturer's, and is generally delivered to the vehicle manufacturer with the nut still loose. On receipt of the hub unit, the vehicle manufacturer fits this hub unit with the nut loose to the prescribed location on the vehicle, and then tightens the nut 11. With the construction of FIG. 1 for example, the tightening of the nut 11 prevents the axially outer end face (left end face in FIG. 1) of the inner ring 8 from being separated from the step portion 12 of the spindle 5. The bearing manufacturer must therefore control the dimensions of the components so that the predetermined preload is applied to the rolling bodies or members 9 when the outer end face of the inner ring 8 is abutted against the step portion 12.

With the above situation, the preload measurements made at the bearing manufacturer's involve measurements with the nut 11 in the untightened condition. Moreover, the measurements must be such that the correct preload is obtained when the nut 11 is actually tightened.

SUMMARY OF THE INVENTION

The method and apparatus for measuring the preload gap of a double row rolling bearing according to the present invention addresses the above situation.

An objective of the present invention is to provide a method and apparatus to measure the preload gap of a double row rolling bearing which comprises an outer ring having a first and second outer raceways on an inner peripheral face thereof, a spindle concentrically disposed inside the outer ring and having a first inner raceway provided on a portion of an outer peripheral face of the spindle opposite to the first outer raceway of the outer ring and a cylindrical surface formed on a portion of the outer peripheral face of the spindle opposite to the second outer raceway of the outer ring, an inner ring fitted onto the cylindrical surface of the spindle and having a second inner raceway on an outer peripheral surface thereof, and a plurality of rolling bodies or members respectively provided between the first outer raceway and the first inner raceway, and between the second outer raceway and the second inner raceway so as to provide free rotation therebetween.

The method according to the present invention for measuring the preload gap of the double row rolling bearing involves pressing the inner ring onto the cylindrical surface of the spindle with no preload applied to the respective rolling bodies or members, obtaining a displacement amount L1 of the outer ring with respect to the spindle and the inner ring by axially displacing the outer ring with respect to the spindle and the inner ring under conditions wherein the inner ring is pressed onto the cylindrical surface of the spindle but a preload is not applied to the respective rolling bodies or members, then obtaining a pressed amount L2 of the inner ring by pressing the inner ring further as far as a predetermined location so as to apply a preload to the respective rolling bodies or members, and making the preload gap the difference between the pressed amount L2 and the displacement amount L1 (L2–L1).

The apparatus according to the present invention for measuring the preload gap of the double row rolling bearing comprises; a support base for supporting the spindle, a press member for pressing the inner ring onto the cylindrical surface of the spindle, a first measuring device for obtaining the axial displacement amount of the press member, a displacement device for axially displacing the outer ring with respect to the spindle and the inner ring, and a second measuring device for obtaining an axial displacement amount of the outer ring caused by the displacement device.

With the method and apparatus of the present invention constructed as described above for measuring the preload gap of a double row rolling bearing, it is possible to accurately determine the preload to be obtained when the inner ring is fully pressed onto the cylindrical surface of the spindle from a condition wherein the rolling bodies or members are not placed in the preloaded condition prior to fully pressing the inner ring.

DESCRIPTION OF PREFERRED EMBODIMENTS

Figure 2:
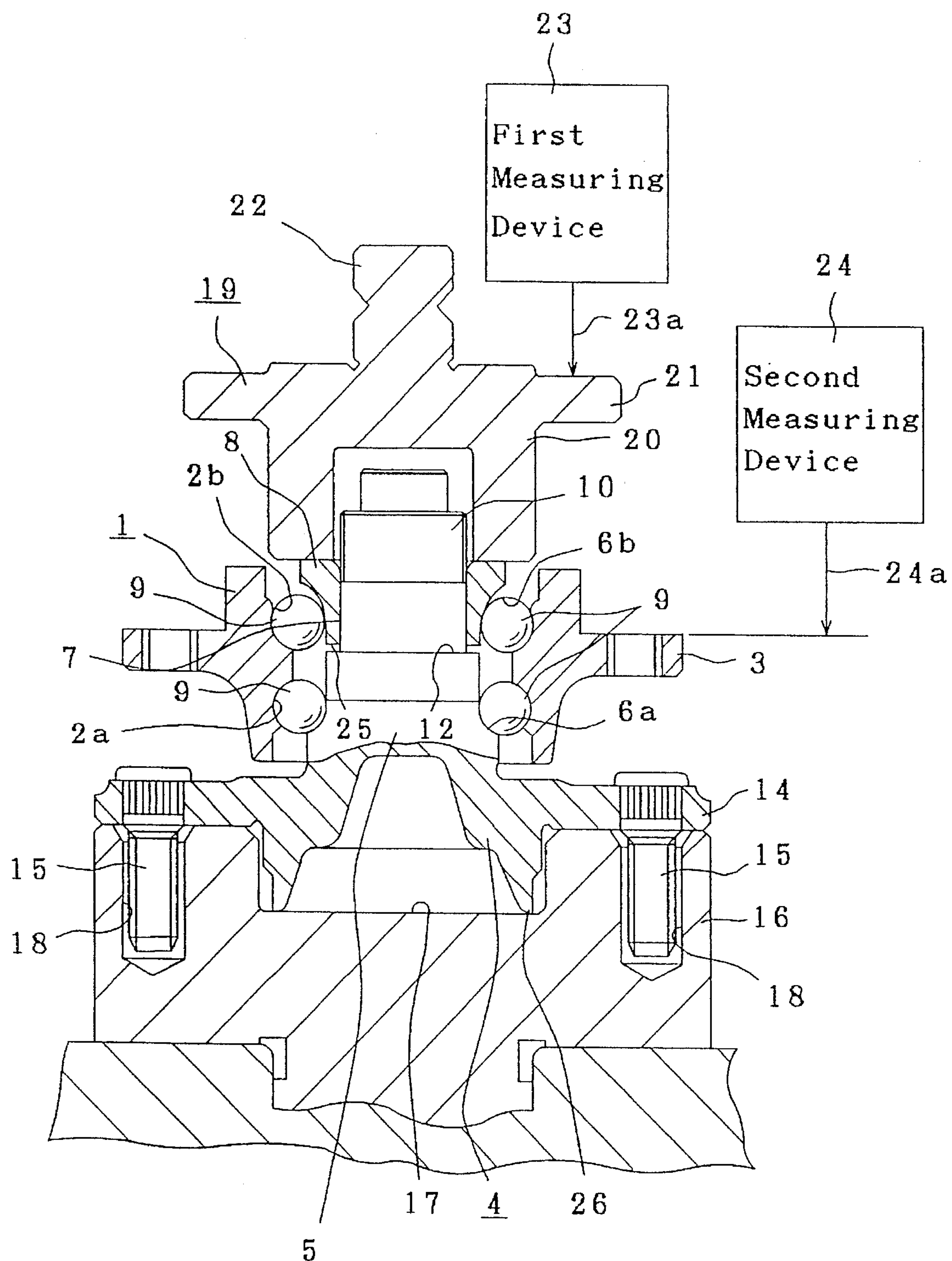
FIG. 2 is a longitudinal cross-sectional view of a first embodiment of an apparatus according to the present invention for measuring the preload gap of a double row rolling bearing.

FIG. 2 shows a first embodiment of an apparatus according to the present invention for measuring the preload gap of a double row rolling bearing.

Figure 1:
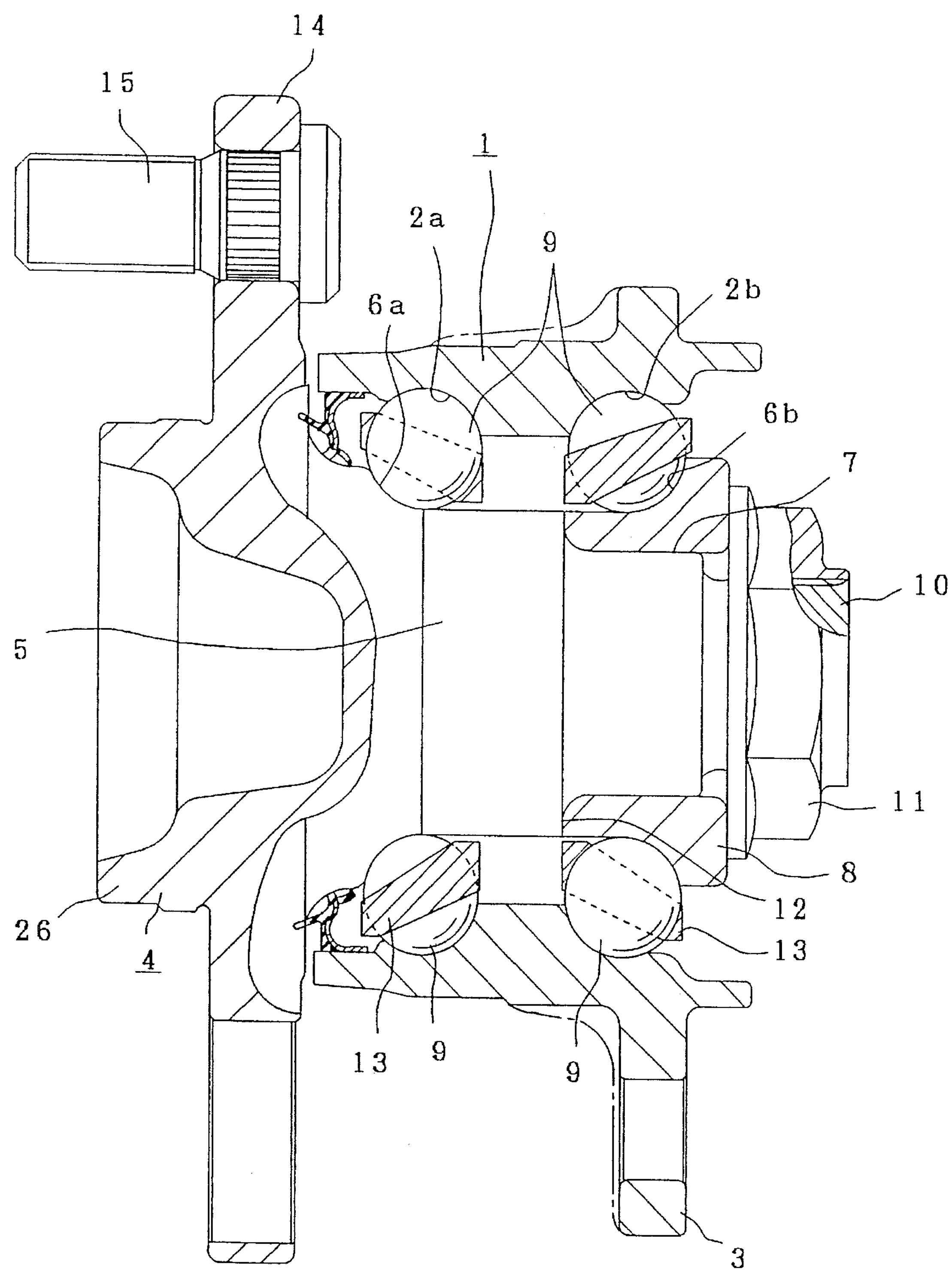
FIG. 1 is a cross-sectional view of a conventional hub unit constituting one type of rolling bearing to which the present invention is directed.

The double row rolling bearing to be measured for preload is a hub unit, which corresponds to the conventional hub unit of FIG. 1 with the nut 11 (FIG. 1) removed. Other parts are substantially the same as those described beforehand, and hence corresponding parts are indicated with the same symbols as in FIG. 1 and description is omitted. For simplicity the retainers or cages are omitted in FIG. 2.

The apparatus comprises a support base 16 for supporting the hub 4 of the hub unit and a press member 19. The support base 16 is formed with a first concavity 17 in a central portion of an upper face thereof, which is shallow and has a larger diameter, and a plurality of second concavities 18 around the periphery of the first concavity 17, which have a small diameter. When the hub 4 is mounted on the upper face of the support base 16, an annular protrusion 26 formed on a central outer end face of the hub 4 is fitted loosely into the first concavity 17, while wheel retaining bolts 15 are fitted loosely into the second concavities 18, respectively. Accordingly the hub 4 is stably mounted on the upper face of the support base 16 with the axially outer end face (the end which is on the outer side in the widthwise direction when assembled on a vehicle) of the hub 4 facing downwards.

The press member 19 is provided above the support base 16 so as to be freely movable in an upward and downward direction. In this respect, the press member 19 is associated with a drive device (not shown in the figure) and connected to a lower end of an output rod of the drive device so as to be moved upwards and downwards by the drive device. The drive device has a construction wherein the output rod can be moved by large pushing and pulling forces upward and downward or in the axial direction. In particular, the downward pushing force is larger, and wherein the displacement of the output rod can be precisely adjusted. Such a drive device may be for example, a hydraulic cylinder, or a feed screw mechanism.

The press member 19 which is raised or lowered by such a drive device, is formed, at a lower end portion thereof with a cylindrical portion 20 having a downward facing opening, at a central outer peripheral face thereof with an outwardly facing flanged brim portion 21, and at an upper end portion thereof with a relatively small diameter connecting portion 22. When connecting the press member 19 to the lower end of the output rod (not shown), the connecting portion 22 is clamped by a chuck (not shown) provided on the lower end of the output rod.

The inner diameter of the cylindrical portion 20 is made larger than the diameter of the male thread 10 formed on the axially inner end of the spindle 5 (the end which is on the inside in a widthwise direction when assembled in the vehicle). Moreover, the outer diameter of the cylindrical portion 20 is made smaller than the inner diameter of the axially inner end of the outer ring 1. Also, the axial length of the cylindrical portion 20 is made longer than the length that the male thread 10 protrudes from the axially inner end face of the inner ring 8. Accordingly, when the cylindrical portion 20 is covering the male thread 10, the lower end face of the cylindrical portion 20 abuts against the axially inner end face of the inner ring 8.

Instrumentation involves a first measuring device 23 provided above the press member 19. An end of a measuring element 23*a* of the first measuring device 23 is contacted against an upper face (or lower face) of the brim portion 21 of the press member 19. Accordingly, the first measuring device 23 is able to measure the axial movement amount (upwards and downwards amount) of the press member 19.

Moreover, a second measuring device 24 is provided above the outer ring 1. An end of a measuring element 24*a* of the second measuring device 24 is contacted against an upper face (or lower face) of the flange 3 formed on the outer peripheral face of the outer ring 1. Accordingly, the second measuring device 24 is able to measure the axial movement amount (upwards and downwards amount) of the outer ring 1.

Various types of known precision comparators may be used as the first measuring device 23 and as the second measuring device 24. Since many types of suitable comparators are available, and the instrumentation has been disclosed in the various literature, then particular examples will not be given here.

Furthermore, although omitted from the figure, a displacement device is provided for axially displacing (raising and lowering) the outer ring 1 relative to the spindle 5 and the inner ring 8. This displacement device may involve for example an actuator which raises and lowers the tip end of an operating arm using a pneumatic force. If the tip end of the operating arm of the actuator is placed against a lower face of the outer ring 1, then the outer ring 1 will be moved in an upwards direction when the tip end of the operating arm is raised, while when the tip end is lowered, the outer ring 1 will fall under its own weight. The axial (upward/downward) force applied to the outer ring 1 by such a displacement device is very much smaller than the force applied to the inner ring 8 by the press member 19.

With the method and apparatus for measuring the preload gap of a double row rolling bearing unit according to the present invention constructed as described above, the procedure for measuring, before using the hub unit (one type of double row rolling bearing), the preload which is to be applied under operating conditions to the hub unit during use is as follows.

At first the inner ring 8 is pressed onto the cylindrical face 7 formed on the spindle 5 of the hub 4, by means of the press member 19. At this time however the inner ring 8 is not pressed fully onto the cylindrical face 7. That is to say, the pressing by the press member 19 is temporarily stopped at a condition wherein there is still a gap or clearance 25 between the axially outer end face of the inner ring 8 and the step portion 12 on the outer peripheral face of the spindle 5.

Figure 3:
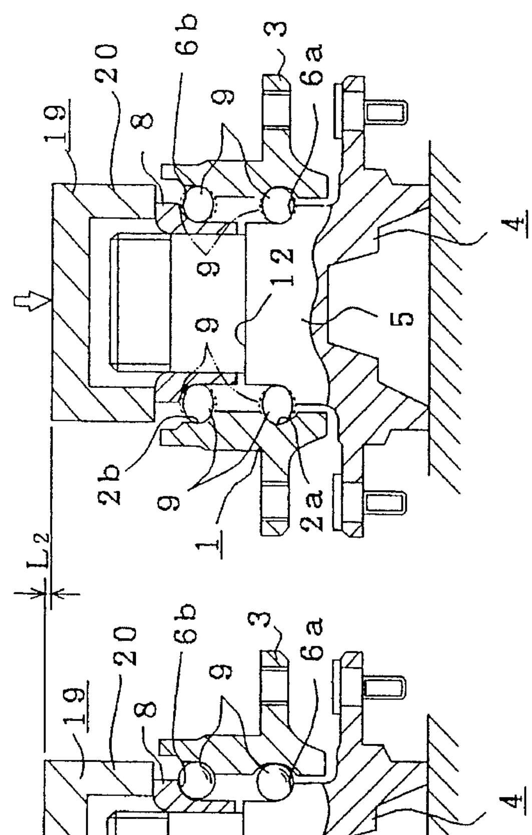
FIGS. 3(A) to (C) are longitudinal cross-sectional views showing steps involved in measuring the preload gap of a double row rolling bearing.
Figure 3:
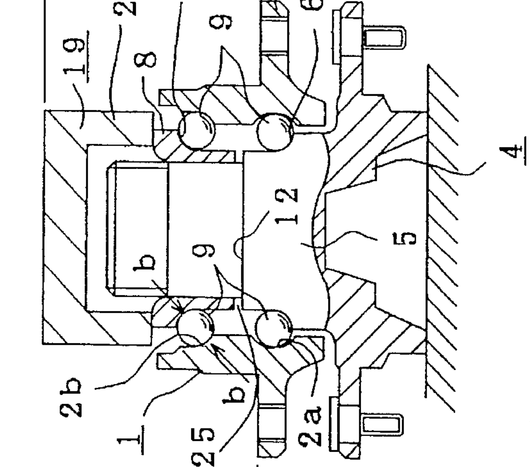
Figure 3:
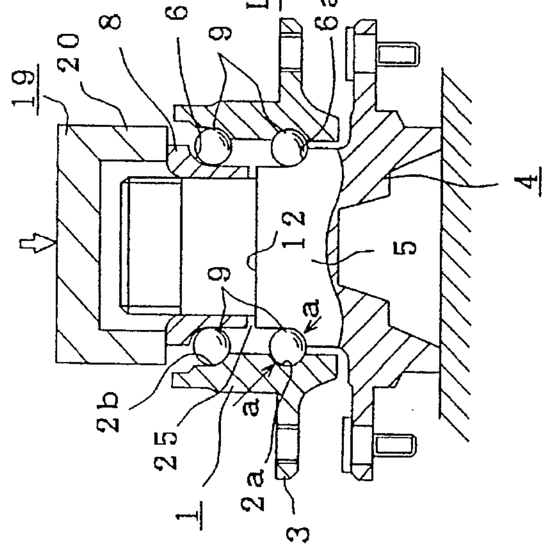

In this condition as shown in FIG. 3(A), the rolling bodies or members 9 in the outside row (lower row in FIG. 2) of the double rows contact the first outer raceway 2*a* and the first inner raceway 6*a* with a predetermined contact angle as shown by arrow "a" in FIG. 3(A). At this stage, the rolling bodies or members 9 in each row are not yet preloaded. That is to say, there is a positive gap (i.e. an actual gap) between the rolling bodies or members 9 in the inside row (upper row in FIG. 2) and the second inner raceway 6*b* on the outer peripheral face of the inner ring 8. Moreover, the outer ring 1 is able to move axially relative to the spindle 5 and the inner ring 8 (able to move upward and downwards) by the amount of this positive gap.

When the press operation is temporarily stopped, the flange 3 on the outer peripheral face of the outer ring 1 is resiliently lifted by the displacement device while the axially inner end face (upper end face) of the inner ring 8 is held down by the press member 19. As a result, the outer ring 1 is raised by a displacement amount L1 (FIG. 3(A) and FIG. 3(B)) corresponding to the length of the positive gap. The displacement amount L1 of the outer ring 1 produced in this way by the displacement device, is measured by the first measuring device 23, and the measurement value sent to a processing device such as a microcomputer (not shown in the figure).

When the outer ring 1 is resiliently raised, the rolling bodies or members 9 in the inside row (upper row in FIG. 2) of the double rows contacts the second outer raceway 2*b* and the second inner raceway 6*b* with a predetermined contact angle as shown by arrow "b" in FIG. 3(B). At this stage also, the rolling bodies or members 9 in each row are not yet preloaded. That is to say, in this condition, there is a positive gap corresponding to the displacement amount L1, between the rolling bodies or members 9 in the outside row (lower row in FIG. 2) and the first outer raceway 2*a* on the inner peripheral face of the outer ring 1.

Once the displacement amount L1 corresponding to the positive gap has been obtained in this way for the condition with no preload applied to the rolling bodies or members 9, the press member 19 which has been temporarily stopped up until this time, is again started and moved downwards so as to apply a preload.

As the press member 19 moves downwards, the inner ring 8 moves by a predetermined amount. That is, as shown in FIG. 3(C), the inner ring 8 is pressed as far as a location wherein the axially outer end face of the inner ring 8 is abutted against the step portion 12 on the outer peripheral face of the spindle 5, so that the gap or clearance 25 disappears. The length that the press member 19 is lowered in this way from after restarting until the axially outer end face of the inner ring 8 contacts the step portion 12 is measured by the second measuring device 24, and the measurement value of length, that is, the pressed amount L2, is sent to the processing device.

The processing device determines the preload gap as the difference (L2–L1) between the pressed amount L2 and the displacement amount L1.

That is to say, during the press operation, at the instant when the press member 19 has moved down by the amount L1, the rolling faces of the rolling bodies or members 9 come into contact with the contact faces of the respective raceway 2*a*, 2*b*, and 6*a*, 6*b* with no gap therebetween but with no preload applied to the rolling bodies or members 9. The press member 19 then continues past the displacement amount L1, and presses the inner ring 8. The amount pressed after the displacement amount L1, that is to say the above-mentioned L2–L1, thus becomes the preload gap.

Figure 4:
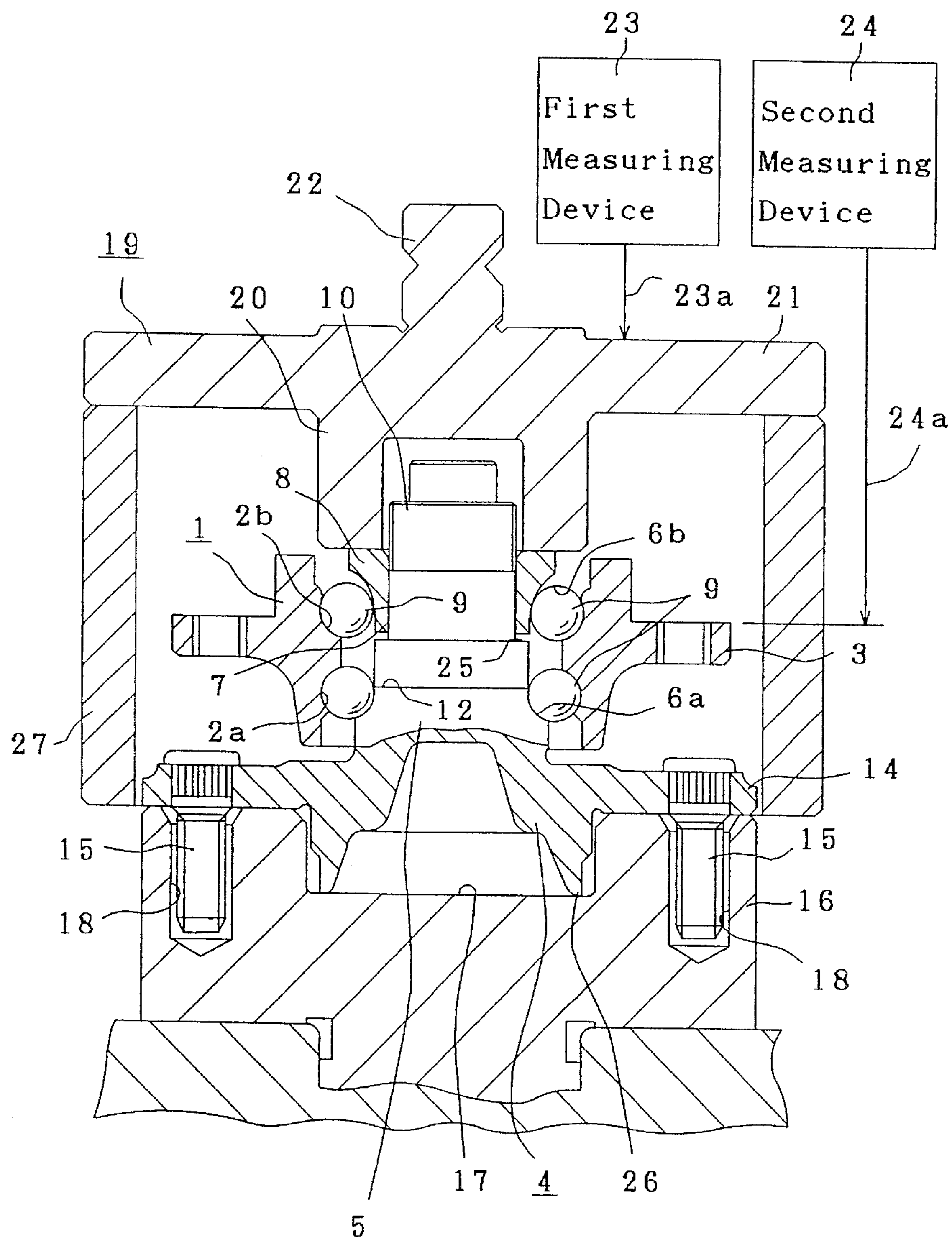
FIG. 4 is a longitudinal cross-sectional view of a second embodiment of an apparatus according to the present invention for measuring the preload gap of a double row rolling bearing.

A second embodiment of an apparatus for measuring the preload gap of a double row rolling bearing according to the present invention, is shown in FIG. 4. With the second embodiment, a spacer 27 is disposed between an outer peripheral portion on the upper face of the support base 16 and an outer peripheral portion on the lower face of the brim portion 21 formed on the press member 19. The spacer 27 comprises a plurality of elements which can be separated from each other, and which form a cylindrical shape when assembled together.

The amount that the press member 19 is lowered by the drive device (not shown) is limited by the spacer 27, thus ensuring that a preload is not applied to the rolling bodies or members 9. If the lowering amount is to be changed, due for example to a change in the type of hub unit to be measured for preload, then a spacer 27 of a different height dimension can be used. When the inner ring 8 is to be pressed further downwards so as to apply a preload to the rolling bodies or members 9 after obtaining the displacement amount L1 of the outer ring 1 relative to the spindle 5 and the inner ring 8, the plurality of spacer elements are moved diametrically outwards, and the press member 19 is then lowered further by the drive device (not shown).

With this embodiment, the drive device (not shown) need not be constructed so that the displacement amount of the output rod can be finely adjusted.

Incidentally, if the pressed amount L2 is to be measured at a different location (i.e. using a different apparatus) by moving the hub unit after measuring the displacement amount L1, then the spacer 27 need not be a separable type. In this case, the device for obtaining the displacement amount L1 is provided with the spacer 27 and the second measuring device 24, and the device for obtaining the pressed amount L2 is provided with the first measuring device 23.

With the second embodiment, the measuring element 24*a* of the second measuring device 24 is inserted inside the spacer 27 through an aperture (not shown in the figure) formed in the brim portion 21, so as to contact against the upper face of the flange 3 on the outer peripheral face of the outer ring 1. The arm of the displacement device (not shown) for axially displacing the outer ring 1 relative to the spindle 5 and the inner ring 8, is inserted inside the spacer 27 through an aperture (not shown) formed in a side face of the spacer 27. Other details of the construction and operation are similar to the beforementioned first embodiment, and hence similar parts are indicated with the same symbols and description is omitted.

With both of the examples shown in the figure, the double row rolling bearing is shown with ball bearings. However, the double row rolling bearing to which the present invention is addressed is not limited to ball bearings but also covers tapered roller bearings.

With the method and apparatus according to the present invention for measuring the preload gap of a double row rolling bearing constructed and operated as described above, the following beneficial effects are obtained.

(1) The preload gap can be accurately measured even before tightening the nut onto the thread for fixing the inner ring to the hub unit or bearing unit.

(2) The measurement operation can be automated so that all double row rolling bearings, for example in the form of hub units, can be inspected at the bearing factory. Consequently, the reliability of the double row rolling bearings, and the vehicles into which they are fitted, can be improved.

(3) If a defect occurs, this can be quickly located, and at the same time the nature of the defect, for example insufficient preload or excessive preload can be determined. Feedback to prevent further defective parts can therefore be made quickly so that the number of rejects can be kept to minimum.

What is claimed is:

1. A method for measuring an axial preload gap of a double row rolling bearing which comprises an outer ring having an inner peripheral face with first and second outer raceways thereon, a spindle concentrically disposed inside the outer ring and having an outer peripheral face with a first inner raceway provided therein, the first inner raceway of the spindle being opposite to the first outer raceway of the outer ring, and a cylindrical surface formed on the outer peripheral face of the spindle, the cylindrical surface of the spindle being opposite to the second outer raceway of the outer ring, an inner ring fitted onto the cylindrical surface of the spindle and having an outer peripheral surface with a second inner raceway thereon, and a plurality of rolling bodies rotatably provided between the first outer raceway and the first inner raceway, and between the second outer raceway and the second inner raceway, comprising the steps of:

obtaining an axial displacement amount L1 of the outer ring with respect to the spindle and the inner ring by axially displacing the outer ring with respect to the spindle and the inner ring under conditions wherein the inner ring is pressed onto the cylindrical surface of the spindle without any preload applied to the rolling bodies, then obtaining a pressed amount L2 by pressing the inner ring to a predetermined axial location so as to apply a preload to the rolling bodies, and making the preload gap the difference (L2–L1) between the pressed amount L2 and the displacement amount L1.

2. An apparatus for measuring an axial preload gap of a double row rolling bearing which includes an outer ring having an inner peripheral face with first and second outer raceways thereon, a spindle concentrically disposed inside the outer ring and having an outer peripheral face with a first inner raceway provided therein, the first inner raceway of the spindle being opposite to the first outer raceway of the outer ring, and a cylindrical surface formed on the outer peripheral face of the spindle, the cylindrical surface of the spindle being opposite to the second outer raceway of the outer ring, an inner ring fitted onto the cylindrical surface of the spindle and having an outer peripheral surface with a second inner raceway thereon, and a plurality of rolling bodies rotatably provided between the first outer raceway and the first inner raceway, and between the second outer raceway and the second inner raceway, the apparatus comprising:

a support base for supporting the spindle, a press member for said pressing the inner ring onto the cylindrical surface of the spindle, a first measuring device for obtaining an axial displacement amount of the press member, a displacement device for axially displacing the outer ring with respect to the spindle and the inner ring, and a second measuring device for obtaining an axial displacement amount of the outer ring caused by the displacement device.

3. A method for measuring as in claim 1, wherein said displacing and said pressing are in opposite directions.

* * * * *